(12) United States Patent
Okada

(10) Patent No.: US 6,538,559 B1
(45) Date of Patent: Mar. 25, 2003

(54) REMOTE CONTROL APPARATUS AND REMOTE CONTROL METHOD

(75) Inventor: Hiroki Okada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/386,413

(22) Filed: Aug. 31, 1999

(30) Foreign Application Priority Data

Sep. 10, 1998 (JP) .......................................... 10-256743

(51) Int. Cl.$^7$ ................................................ G06F 7/04
(52) U.S. Cl. ................................ 340/5.72; 340/825.72; 340/825.69; 340/5.54; 340/5.64; 701/34; 701/114; 714/25
(58) Field of Search ...................... 340/825.72, 825.69, 340/5.54, 5.64, 5.62, 3.43, 3.44; 307/10.1, 9.1; 324/402; 701/114, 32, 34, 33; 714/25

(56) References Cited

U.S. PATENT DOCUMENTS

| 5,684,337 A | 11/1997 | Wallace |
| 5,907,287 A | * 5/1999 | Sakagami et al. ..... 340/825.31 |
| 5,973,611 A | * 10/1999 | Kulha et al. ........... 340/825.31 |

FOREIGN PATENT DOCUMENTS

| EP | 0 295 373 | 3/1988 |
| EP | 8-162829 | 6/1996 |
| JP | 7-150835 | 6/1995 |
| JP | 8-284504 | 10/1996 |

* cited by examiner

Primary Examiner—Michael Horabik
Assistant Examiner—M Shimizu
(74) Attorney, Agent, or Firm—Pillsbury Winthrop LLP

(57) ABSTRACT

A remote control apparatus has a plurality of transmission request devices for transmitting a transmission request signal, a receiver for receiving the response signal transmitted in response to the transmission request signal, an operation control device for controlling an operation state of an operating machine depending on whether or not the receiver has received the response signal, and a mobile unit for transmitting a response signal in response to the transmission request signal. The remote control apparatus further includes a failure diagnosing device for diagnosing a failure in each of the transmission request devices. Thus, when a malfunction occurs with one of the transmission request devices or a mobile unit, it is possible to easily find out where the failure has occurred.

9 Claims, 6 Drawing Sheets

REMOTE CONTROL APPARATUS AND REMOTE CONTROL METHOD

BACKGROUND OF THE INVENTION

Incorporation by Reference

The disclosure of Japanese Patent Application No. HEI 10-256743 filed on Sep. 10, 1998 including the specification, drawings and abstract is incorporated herein by reference in its entirety. This invention also relates to a remote control method.

1. Field of the Invention

The present invention relates to a remote control apparatus and, more particularly, to a remote control apparatus that performs a code verifying operation through communication with a mobile unit and permits or prohibits use of a remotely located operating machine based on the verification result.

2. Description of the Related Art

As the related art, there is known a remote control apparatus that performs a code collating operation through communication with a mobile unit and permits or prohibits use of a remotely located operating machine based on the collation result.

For example, according to what is disclosed in JP 7-150835, a high-frequency electromagnetic field is generated in one of the antennas located at a plurality of locations such as a door of a vehicle, a driver's seat and the like, when a transmission request is made. Then a mobile unit, such as a driver's license, receives the high-frequency electromagnetic field and converts it into electric power, that is used to retrieve a data signal of a predetermined code from the mobile unit. The antenna on the vehicle side that has generated the above-described high-frequency electromagnetic field receives the data signal. If the received code coincides with the predetermined stored code, control operations such as unlocking the vehicle doors, permitting the engine to start and the like are performed depending on the antenna that received the data signal, and made the transmission request.

In the related art, in order to perform control operations such as unlocking the vehicle doors, permitting the engine to start and the like, an antenna serving as transmission request means and an oscillation circuit are provided at a plurality of locations of the vehicle. Thus, in the case when a malfunction occurs with any of the transmission request means or with the mobile unit, it is difficult to determine where a failure has occurred.

SUMMARY OF THE INVENTION

The present invention has been developed in response to the aforementioned circumstances. An object of the present invention is to provide a remote control apparatus that can determine easily where a failure has occurred when a malfunction occurs with any of the transmission request devices or a mobile unit with the aid of a failure diagnosing device that diagnoses the presence of a failure in the respective transmission request means.

According to a first aspect of the present invention, the remote control apparatus includes a plurality of transmission request devices, a mobile unit, a receiver, an operation control device, and a failure diagnosing device. Each of the plurality of transmission request devices transmit a transmission request signal. The mobile unit transmits a response signal in response to the transmission request signal. The receiver receives the response signal that was transmitted in response to the transmission request signal, The operation control device controls an operation state of an operating machine depending on whether or not the receiver has received the response signal. The failure diagnosing device diagnoses a failure in each of the transmission request devices.

As described above, the remote control apparatus of the first aspect has a failure diagnosing device for diagnosing a failure in each of the transmission request devices. Therefore, when a malfunction occurs with any of the transmission request devices or the mobile unit, it is possible to recognize easily where a failure has occurred. In addition to the feature of the construction of the first aspect, the failure diagnosing device may further include a mode switching device for introducing a failure diagnosing mode into the operation control device, and a transmission request selection device for selecting one of the transmission request devices in the failure diagnosing mode and causing the selected transmission request device to transmit a transmission request signal.

Thus, when the failure diagnosing mode is introduced into the operation control device, one of the transmission request devices is selected and required to transmit a transmission request signal. Hence, the mobile unit is placed at various locations within a detectable zone of the transmission request signal from the selected transmission request device, and the operation thereof can be confirmed based on a state of communication between the transmission request device and the mobile unit.

Furthermore, the failure diagnosing device may further include a warning device which operates when the transmission request device fails.

Furthermore, the failure diagnosing device may also include a selection switching device for switching sequentially between the transmission request devices that are selected by the transmission request selection device. Thus, one of the transmission request devices to be selected by the transmission request selection device is sequentially switched from one to another. The operation of the transmission request devices can be confirmed one by one.

Furthermore, the mode switching device may be designed to introduce the failure diagnosing mode by means of a specific operation of the mobile unit. Thus, the operation control device is introduced by means of a specific operation of the mobile unit. Therefore, it is possible to prevent unexpected introduction of the failure diagnosing mode during a normal state of use and eliminate the need to provide a button that is used exclusively for switching modes.

According to the present invention, the remote control method comprising the steps of providing a plurality of transmission request devices for transmitting a transmission request signal, a mobile unit for transmitting a response signal in response to the transmission request signal, a receiver for receiving the response signal transmitted in response to the transmission request signal and an operation control device for controlling an operation state of an operating machine depending on whether or not the receiver has received the response signal, switching the operation control device into a failure diagnosing mode, selecting one of the transmission request devices in the failure diagnosing mode, causing the selected transmission request device to transmit a transmission request signal, receiving the response signal transmitted in response to the transmission request signal, performing a code verifying operation through communication between the transmission request device and the mobile unit and diagnosing a failure in the selected transmission request device based on the result of the code verification.

As described above, when a malfunction occurs with any of the transmission request devices or the mobile unit, it is possible to recognize easily where a failure has occurred.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENT

Figure 1:
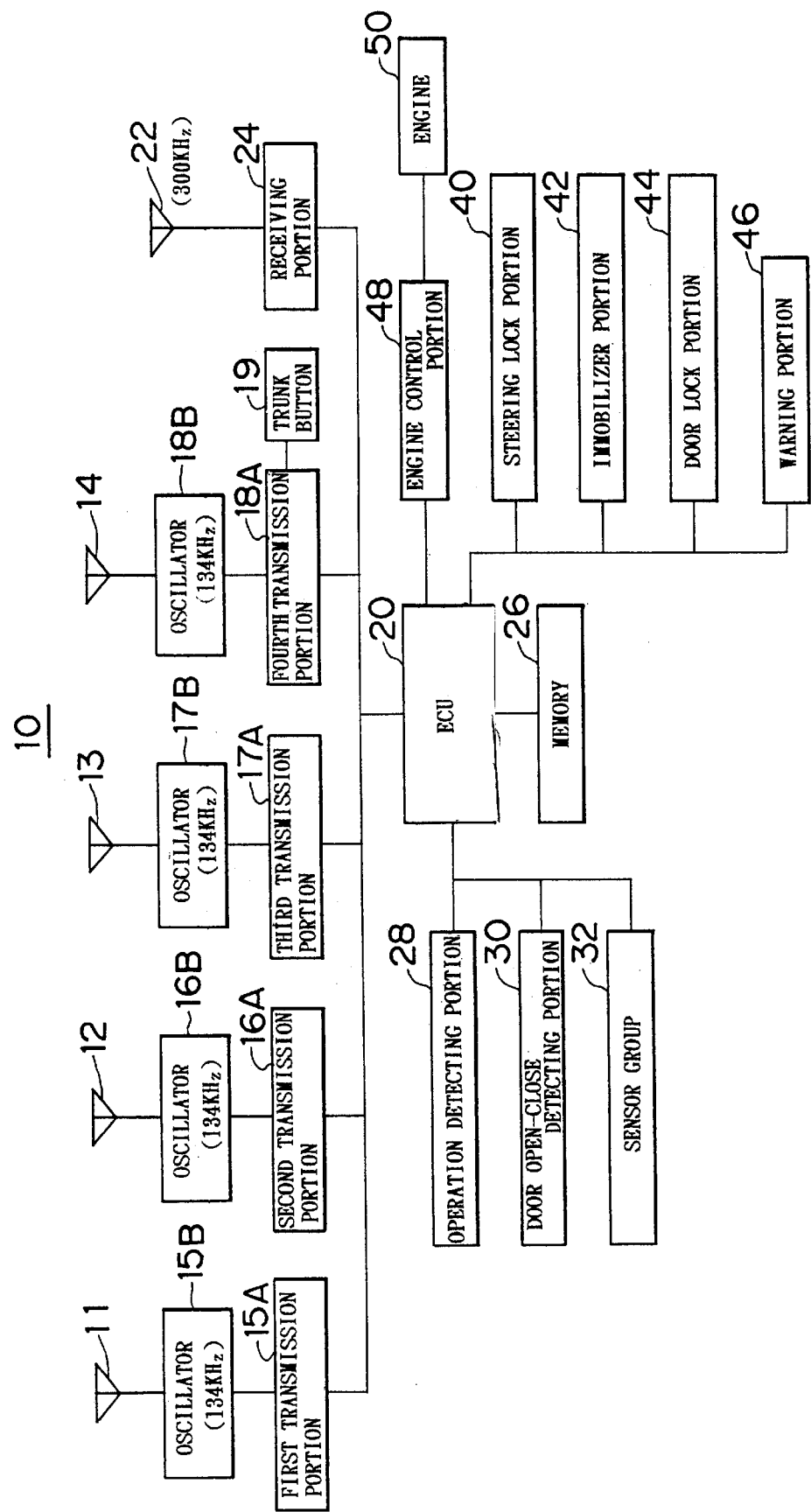
FIG. 1 is a block diagram of an apparatus according to one embodiment of the present invention, which is applied to a motor vehicle.
Figure 2:
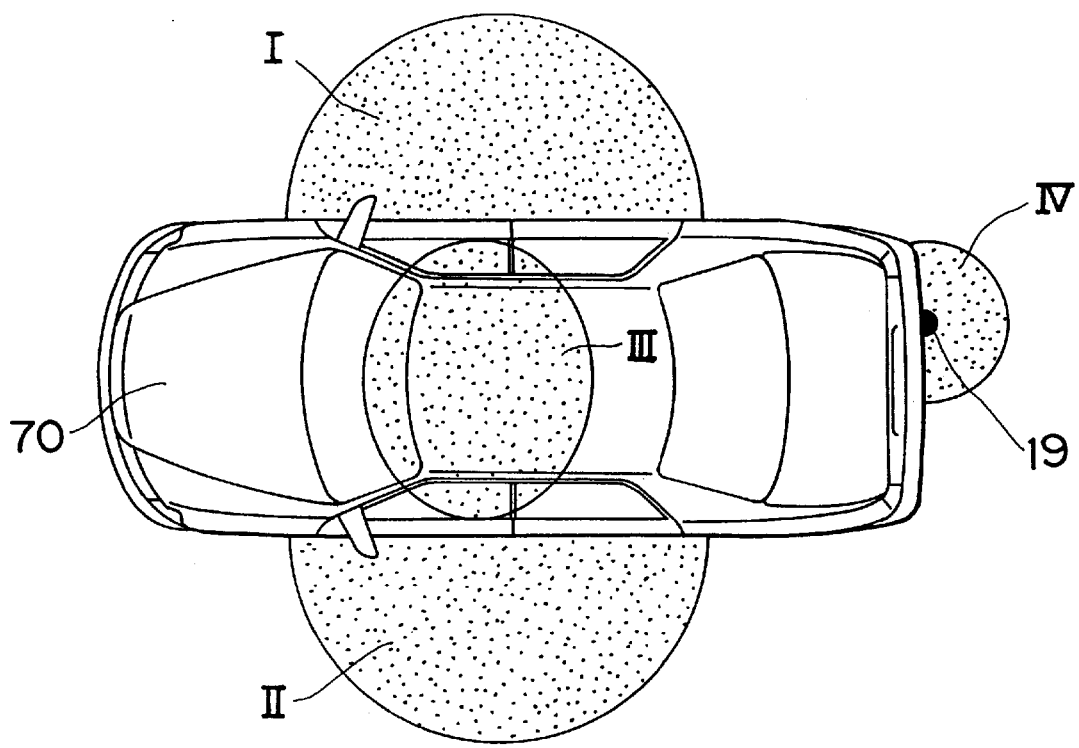
FIG. 2 shows detection zones I, II, III and IV of first, second, third and fourth transmission antennas respectively.

FIG. 1 is a block diagram according to one embodiment of the present invention in which an apparatus of the present invention is applied to a motor vehicle. As sown in FIG. 1, a vehicle-mounted apparatus 10 has first to fourth transmission antennas 11 to 14. As shown in FIG. 2, the first transmission antenna 11 is located at a door handle of a driver's seat of a vehicle 70. The second transmission antenna 12 is lcoated at a door handle of a passenger seat of the vehicle 70. The third transmission antenna 13 is provided in the vicinity of an instrument panel in a passenger compartment of the vehicle 70. The fourth transmission antenna 14 is provided at a trunk door of the vehicle 70. FIG. 2 shows receivable zones or detection zones I, II, III and IV of mobile units corresponding to the first to fourth transmission antennas 11 to 14, respectively. The first to fourth transmission antennas 11 to 14 are connected to oscillators 15B to 18B respectively that belong to first to fourth transmission portions 15A to 18A respectively. The first to fourth transmission portions 15A to 18A are connected to an ECU (electronic control unit) 20. Further, as shown in FIG. 2, a trunk button 19 is provided at the trunk door of the vehicle 70. The trunk button 19 is connected to the fourth transmission portion 18A.

The ECU 20 supplies a first request code to the first, second and fourth transmission portions 15A, 16A and 18A, and supplies a second request code to the third transmission portion 17A. The first and second request codes are modulated into request signals with a frequency, for example, of 134 kHz. The first to fourth transmission antennas 11 to 14 transmit the request signals to mobile units 60.

In practice, the first to fourth transmission portions 15A to 18A including the oscillators 15B to 18B may be integrated into a single circuit. Further, the vehicle is equipped with a receiving antenna 22 that receives signals from the mobile unit 60. The signals have a frequency, for example, of 300 MHz, and are decoded at a receiving portion 24 and then supplied to the ECU 20.

A memory 26 is connected to the ECU 20. The memory 26 stores a plurality of distinct codes. For example, a first code for door lock, a second code for engine start, a transponder ID code and the like. The memory 26 is a non-volatile memory, such as an EEPROM, and can retain the stored contents even when a power source is disconnected.

An operation detecting portion 28 detects various switching operations performed by a user. For example, the operation detecting portion 28 detects the operation of an ignition switch, and supplies a corresponding operation detecting signal to the ECU 20. A door open-close detecting portion 30 detects the open or closed state of various doors, including the trunk door, and supplies a corresponding detection signal to the ECU 20. A sensor group 32 is composed of various sensors for detecting the vehicle speed, the open and closed state of the windows and so forth. Detection signals from these sensors are supplied to the ECU 20.

Further, a steering lock portion 40, an immobilizer portion 42 and a door lock portion 44 are connected to the ECU 20. The steering lock portion 40 is a mechanism for mechanically prohibiting the operation of a steering wheel. The immobilizer portion 42 is a mechanism for prohibiting the supply of fuel to an engine 50 and the operation of ignition. The door lock portion 44 is a mechanism for locking/unlocking the respective doors. Further, a warning portion 46 outputs a warning in the form of buzzer sound, flickering light or the like. An engine control portion 48 is also connected to the ECU 20. The engine control portion 48 employs a sel-motor so as to control the starting of the engine. The engine control portion 48 is also capable of suspending the driving of the engine 50.

Figure 3:
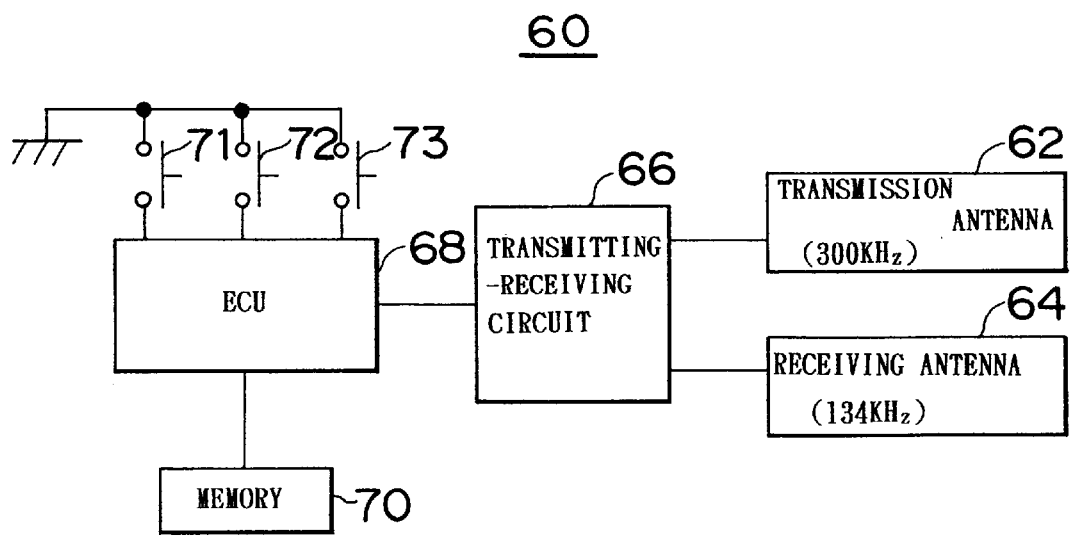
FIG. 3 is a block diagram of a mobile unit of the apparatus according to one embodiment of the present invention.

FIG. 3 is a block diagram of a mobile unit according to one embodiment of the apparatus of the present invention. Referring to FIG. 3, the mobile unit 60 has a transmission antenna 62 and a receiving antenna 64. These antennas 62 and 64 are connected to a transmitting-receiving circuit 66, which is in turn connected to an ECU 68. A memory 70, a lock switch 71, an unlock switch 72 and a trunk switch 73 are also connected to the ECU 68.

The receiving antenna 64 receives from the vehicle-mounted apparatus 10 a request signal with a frequency, for example, of 134 kHz. The request signal is decoded in the transmitting-receiving circuit 66 and then supplied to the ECU 68. Further, the ECU 68 supplies first and second codes retrieved from the memory 70 to the transmitting-receiving circuit 66. The first and second codes are modulated in the transmitting-receiving circuit 66 and then transmitted from the transmission antenna 62 to the vehicle-mounted apparatus 10 in the form of signals with a frequency, for example, of 300 MHz.

If the lock switch 71, the unlock switch 72 and the trunk switch 73 are operated, the ECU 68 causes the transmission antenna 62 to transmit signals to the vehicle-mounted apparatus 10. These signals are modulated from command codes for locking the doors beside the driver's seat or the passenger seat, unlocking the doors beside the driver's seat or the passenger seat, and unlocking the trunk door.

Figure 4:
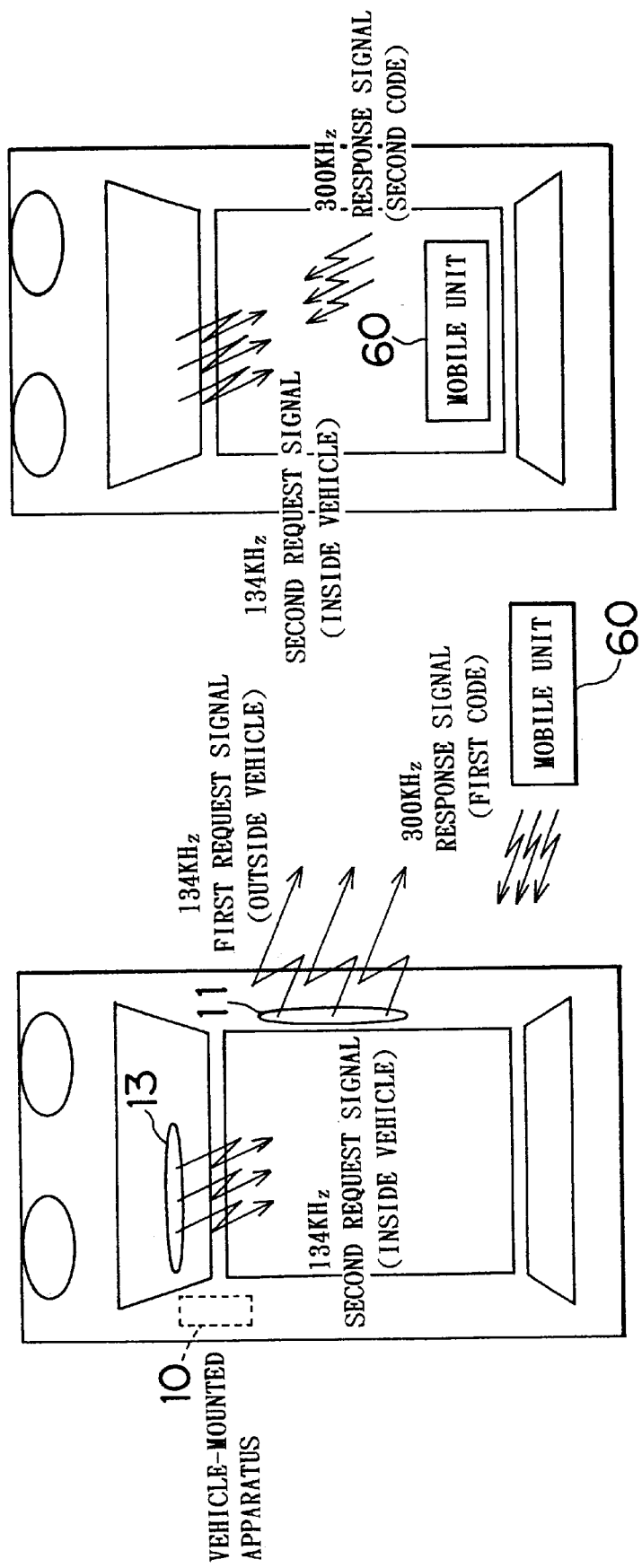
FIG. 4 schematically illustrates communication among the first and third transmission antennas and a mobile unit 60.

FIG. 4 schematically illustrates communication between the first and third transmission antennas and the mobile unit 60. Referring to FIG. 4, the first and third transmission antennas 11 and 13 of the vehicle-mounted apparatus 10 transmit first and second request signals with a frequency of 134 kHz. After receiving the first and second request signals, the mobile unit 60 returns signals with a frequency of 300 MHz that are modulated from the first and second codes in accordance with the received request signals. The signals with a frequency of 300 MHz, which have been received by the receiving antenna 22 of the vehicle-mounted apparatus 10, are decoded in the receiving circuit 24 and then supplied to the ECU 20. The ECU 20 receives the above-described first and second codes.

Figure 5:
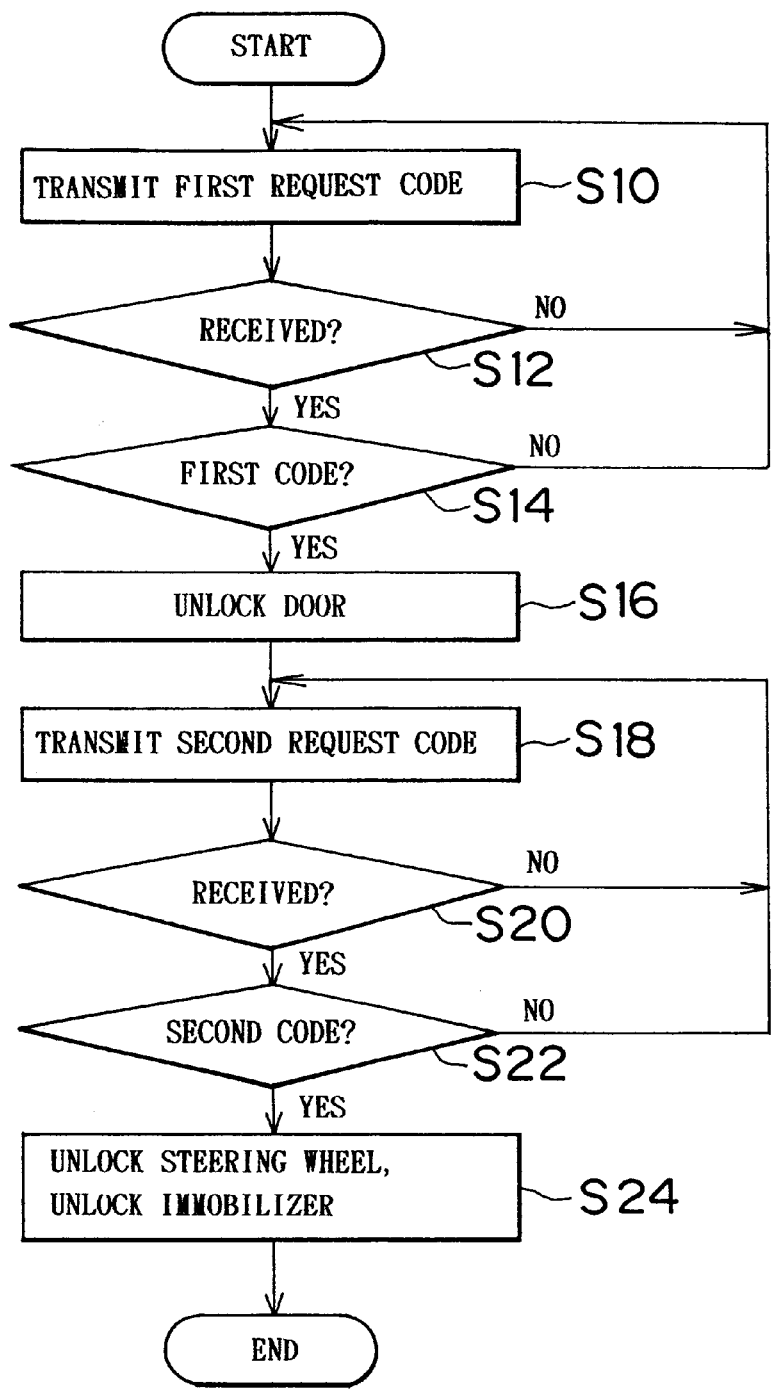
FIG. 5 is a flowchart of engine starting processings performed by an ECU 20 of the apparatus according to one embodiment of the present invention.

FIG. 5 is a flowchart of engine starting processes carried out by the ECU 20 of the apparatus according to one embodiment of the present invention. When all the doors are locked, the ECU 20 carries out the processes at regular time intervals (for example, every 200 msec). Referring to FIG. 5, in step S10, the ECU 20 causes a request signal with a frequency of 134 kHz, which has been modulated from a first request code, to be generated in the transmission portion 15A or 16A. This request signal is transmitted from the first or second transmission antenna 11 or 12. Every time the process passes through step S10, the first and second transmission antennas 11 and 12 are alternately selected, and a request signal is transmitted from one of them.

Thereafter, it is determined in step S12 whether or not the receiving circuit 24 has received a response signal from the mobile unit 60, which has a frequency of 300 MHz. If the receiving circuit 24 has received the response signal, the process proceeds to step S14, where a decoded code supplied from the receiving circuit 24 is collated with the first code stored in the memory 26. If the receiving circuit 24 has not received the response signal from the mobile unit 60, or if the decoded code does not coincide with the first code, the process returns to step S10. If the receiving circuit 24 has received the response signal from the mobile unit 60 and the decoded code coincides with the first code, the process proceeds to step S16.

In the case where the user approaches the vehicle holding the authorized mobile unit 60, the receiving antenna 64 receives a request signal with a frequency of 134 kHz, which has been modulated from the first request code. Thus, the mobile unit 60 returns a signal with a frequency of 300 MHz, which has been modulated from the first code in accordance with the first request code, to the transmission antenna 62. If the code decoded in step S14 coincides with the first code, the process proceeds to step S16 because the user has approached the vehicle holding the authorized mobile unit 60. The door lock portion 44, as controlled in step S16, unlocks either the door beside the driver's seat or the door beside the passenger seat depending on which one of the first and second transmission antennas 11 and 12 transmitted the signal.

Then in step S18, the ECU 20 causes the second transmission antenna 12 provided in the vicinity of the instrument panel in the passenger compartment to transmit a request signal with a frequency of 134 kHz, which has been modulated from the second request code. After that, it is determined in step S20 whether or not the receiving circuit 24 has received a response signal from the mobile unit 60. If the receiving circuit 24 has received the response signal, the process proceeds to step S22, where the decoded code supplied from the receiving circuit 24 and the second code stored in the memory 26 are compared. If the receiving circuit 24 has not received the response signal from the mobile unit 60 or if the decoded code does not coincide with the second code, the process returns to step S18. If the receiving circuit 24 has received the response signal from the mobile unit 60 and the decoded code coincides with the second code, the process proceeds to step S24.

In step S24, if the user has entered the vehicle holding the authorized mobile unit 60, the ECU 20 controls the steering lock portion 40 to unlock the steering wheel, controls the immobilizer portion 42 to remove the prohibition of fuel supply to the engine 50 as well as the operation of ignition. Thus, if the user rotates an ignition key to a predetermined location, the engine control portion 48 starts the engine 50.

As for the trunk door, if the operation detecting portion 28 has detected operation of the trunk button 19, the same processes as in the aforementioned steps S10 to S16 are carried out so as to unlock the trunk door. Further, the same construction can also be applied to the doors beside-the driver's seat and the passenger seat. That is, when buttons provided at the door handles are pressed, the aforementioned processes in steps S10 to S16 are performed.

Figure 6:
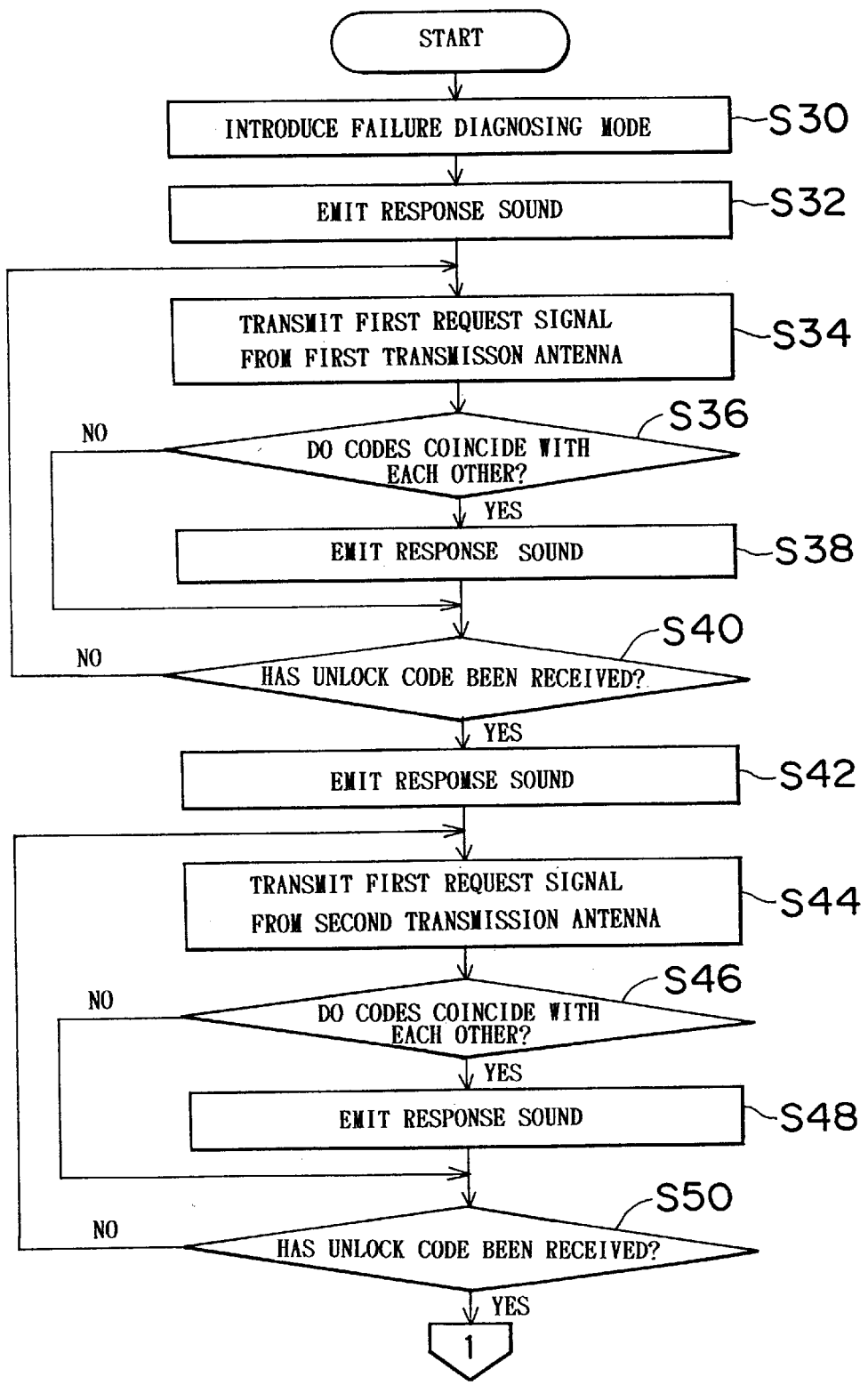
FIG. 6 illustrates a flowchart of a failure diagnosing processing that is performed by the ECU 20 of the apparatus according to one embodiment of the present invention during a failure diagnosing mode.
Figure 7:
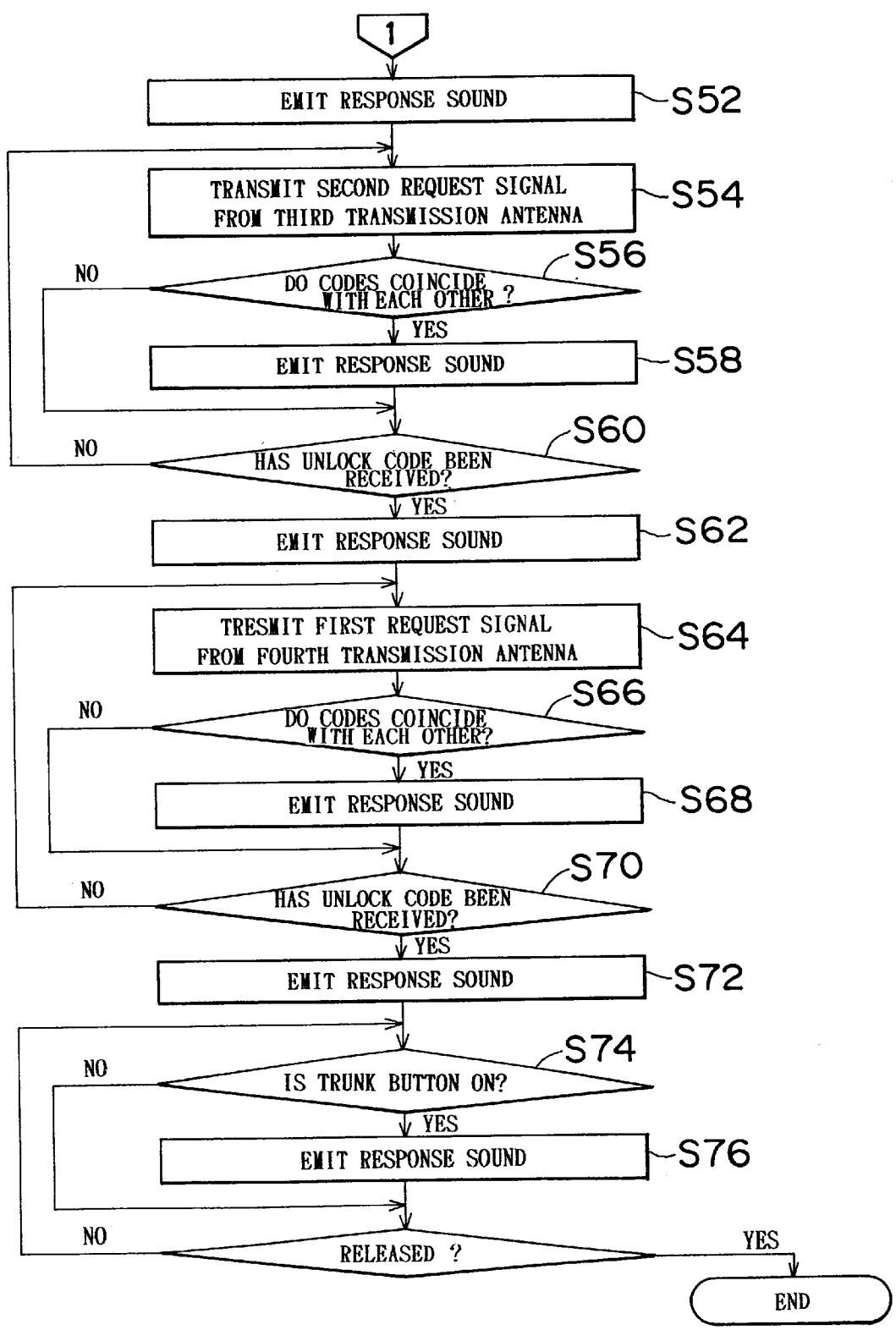
FIG. 7 illustrates a flowchart of the failure diagnosing processing that is performed by the ECU 20 of the apparatus according to one embodiment of the present invention during the failure diagnosing mode.

It will now be described how to diagnose a failure in the apparatus of the present invention. FIGS. 6 and 7 illustrate flowcharts of a failure diagnosing process that is performed by the ECU 20 of the apparatus according to one embodiment of the present invention during a failure diagnosing mode. In order to set the apparatus of the present invention in the failure diagnosing mode, a specific operation that cannot be performed in a normal state of use is performed. For example, the specific operation occurs when the user sequentially presses the lock switch 71, the unlock switch 72 and the trunk switch 73 of the mobile unit 60. Thereby, the mobile unit 60 transmits code signals corresponding to the respective switches to the vehicle-mounted apparatus 10.

If the codes corresponding to the lock switch 71, the unlock switch 72 and the trunk switch 73 are decoded in the receiving circuit 24, the ECU 20 starts performing the processes shown in FIG. 6. That is, a failure diagnosing mode is set in step S30, and response sound is emitted from the warning portion 46 (for example, buzzer tone is issued twice) in step S32. By perceiving the response sound, the user can confirm that the failure diagnosing mode is in operation. If there is no response sound despite the operation of sequentially pressing the lock switch 71, the unlock switch 72 and the trunk switch 73, the user can confirm that there is a failure in the mobile unit 60, the receiving antenna 22, the receiving portion 24 or the ECU 20.

Thereafter, the ECU 20 supplies a first request code to the first transmission portion 15A in step S34. Then, the ECU 20 causes the first transmission antenna 11 provided at the door handle beside the driver's seat to transmit a first request signal in the form of a burst at intervals of one second. Then in step S36, the ECU 20 verifies a code decoded in the receiving circuit 24 from the response signal with a frequency of 300 MHz, which has been transmitted from the mobile unit 60, and the first code stored in the memory 26, and determines whether or not those codes coincide with each other. If the decoded code coincides with the first code, the process proceeds to step S38, where the response sound is emitted from the warning portion 46 (for example, buzzer tone is issued once). If the decoded code does not coincide with the first code, the process proceeds to step S40.

Then in step S40, the ECU 20 determines whether or not the code corresponding to the unlock switch 72 has been decoded in the receiving circuit 24 by pressing the unlock switch 72 of the mobile unit 60. If the code corresponding to the unlock switch 72 has not been decoded in the receiving circuit 24, the process proceeds to step S34, where transmission of a first request signal from the first transmission antenna 11 is repeated.

In a state where transmission of a first request signal from the aforementioned first transmission antenna 11 is repeated, the user sets the mobile unit 60 at respective locations in the detection zone I as shown in FIG. 2 to confirm whether or not the response sound is being emitted. If the response sound is obtained only in the vicinity of the first transmission antenna 11 in the detection zone I, the user can confirm that there is a failure in the first transmission antenna 11 or the oscillator 15B. If response sound is not obtained in the entire detection zone I, the user can confirm that there is a failure in the first transmission antenna 11, the first transmission portion 15A or the oscillator 15B.

On the other hand, if the code corresponding to the unlock switch 72 is decoded in the receiving circuit 24 in step S40, the response sound is emitted from the warning portion 46 (for example, buzzer tone is issued twice) in step S42.

Thereafter, the ECU 20 supplies a first request code to the second transmission portion 16A in step S44. Then, the ECU 20 causes the second transmission antenna 12 provided at the door handle beside the passenger seat to transmit a first request signal in the form of a burst at intervals of one second. Then in step S46, the ECU 20 compares a code decoded in the receiving circuit 24 from the response single with a frequency of 300 MHz, which has been transmitted from the mobile unit 60, and the first code stored in the memory 26, and determines whether or not those codes coincide with each other. If the decoded code coincides with the first code, the process proceeds to step S48, where response sound is emitted from the warning portion 46 (for example, buzzer tone is issued once). If the decoded code does not coincide with the first code, the process proceeds to step S50.

Then in step S50, the ECU 20 determines whether or not the code corresponding to the unlock switch 72 has been decoded in the receiving circuit 24 by pressing the unlock switch 72 of the mobile unit 60. If the code corresponding to the unlock switch 72 has not been decoded in the receiving circuit 24, the process returns to step S44, where transmission of a first request signal from the second transmission antenna 12 is repeated.

In a state where transmission of a first request signal from the aforementioned second transmission antenna 12 is repeated, the user sets the mobile unit 60 at respective locations in the detection zone II as shown in FIG. 2 to confirm whether or not the response sound is being emitted. If the response sound is obtained only in the vicinity of the second transmission antenna 12 in the detection zone II, the user can confirm that there is a failure in the second transmission antenna 12 or the oscillator 16B. If the response sound is not obtained in the entire detection zone II, the user can confirm that there is a failure in the second transmission antenna 12, the second transmission portion 16A or the oscillator 16B.

On the other hand, if the code corresponding to the unlock switch 72 is decoded in the receiving circuit 24 in step S50, response sound is emitted from the warning portion 46 (for example, buzzer tone is issued twice) in step S52 as shown in FIG. 7.

Thereafter, the ECU 20 supplies a second request code to the third transmission portion 17A in step S54. Then, the ECU 20 causes the third transmission antenna 13 provided in the vicinity of the instrument panel in the passenger compartment to transmit a second request signal in the form of a burst at intervals of one second. Then in step S56, the ECU 20 compares a code decoded in the receiving circuit 24 from the response single with a frequency of 300 MHz, which has been transmitted from the mobile unit 60, with the second code stored in the memory 26, and determines whether or not those codes coincide with each other. If the decoded code coincides with the second code, the process proceeds to step S58, where response sound is emitted from the warning portion 46 (for example, buzzer tone is issued once). If the decoded code does not coincide with the second code, the process returns to step S60.

Then in step S60, the ECU 20 determines whether or not the code corresponding to the unlock switch 72 has been decoded in the receiving circuit 24 by pressing the unlock switch 72 of the mobile unit 60. If the code corresponding to the unlock switch 72 has not been decoded in the receiving circuit 24, the process returns to step S54, where transmission of a second request signal from the third transmission antenna 13 is repeated.

In a state where transmission of a second request signal from the aforementioned third transmission antenna 13 is repeated, the user sets the mobile unit 60 at respective locations in the detection zone III as shown in FIG. 2 to confirm whether or not the response sound is being emitted. If response sound is obtained only in the vicinity of the third transmission antenna 13 in the detection zone III, the user can confirm that there is a failure in the third transmission antenna 13 or the oscillator 17B. If response sound is not obtained in the entire detection zone III, the user can confirm that there is a failure in the third transmission antenna 13, the third transmission portion 17A or the oscillator 17B.

On the other hand, if the code corresponding to the unlock switch 72 is decoded in the receiving circuit 24 in step S60, response sound is emitted from the warning portion 46 (for example, buzzer tone is issued twice) in step S62.

Thereafter, the ECU 20 supplies a first request code to the fourth transmission portion 18A in step S64. Then, the ECU 20 causes the fourth transmission antenna 14 provided at the trunk door to transmit a first request signal in the form of a burst at intervals of one second. Then in step S66, the ECU 20 compares a code decoded in the receiving circuit 24 from the response single with a frequency of 300 MHz, which has been transmitted from the mobile unit 60, with the first code stored in the memory 26, and determines whether or not those codes coincide with each other. If the decoded code coincides with the first code, the process proceeds to step S68, where response sound is emitted from the warning portion 46 (for example, buzzer tone is issued once). If the decoded code does not coincide with the first code, the process returns to step S70.

Then in step S70, the ECU 20 determines whether or not the code corresponding to the unlock switch 72 has been decoded in the receiving circuit 24 by pressing the unlock switch 72 of the mobile unit 60. If the code corresponding to the unlock switch 72 has not been decoded in the receiving circuit 24, the process returns to step S64, where transmission of a first request signal from the fourth transmission antenna 14 is repeated.

In a state where transmission of a first request signal from the aforementioned fourth transmission antenna 14 is repeated, the user sets the mobile unit 60 at respective locations in the detection zone IV as shown in FIG. 2 to confirm whether or not the response sound is being emitted. If response sound is obtained only in the vicinity of the fourth transmission antenna 14 in the detection zone IV, the user can confirm that there is a failure in the fourth transmission antenna 14 or the oscillator 18B. If response sound is not obtained in the entire detection zone IV, the user can confirm that there is a failure in the fourth transmission antenna 14, the fourth transmission portion 18A or the oscillator 18B.

On the other hand, if the code corresponding to the unlock switch 72 is decoded in the receiving circuit 24 in step S70, the response sound is emitted from the warning portion 46 (for example, buzzer tone is issued twice) in step S72. Furthermore, the ECU 20 determines in step S74 whether or not the trunk button 19 has been pressed through the fourth transmission portion 18A. If the operation of the trunk button 19 has been detected, the process proceeds to step S76, where the response sound is emitted from the warning portion 46 (for example, buzzer tone is issued once). By perceiving the response sound, the user can confirm that nothing is wrong with the trunk button 19. In the absence of the response sound, the user can confirm that there is a failure in the trunk button 19. If the operation of the trunk button 19 has not been detected, the process proceeds to step S78.

Thereafter, the user sequentially presses the trunk switch 73, the unlock switch 72 and the lock switch 71 of the mobile unit 60. Thereby, the mobile unit 60 transmits code signals corresponding to the respective switches to the vehicle-mounted apparatus 10.

If the codes corresponding to the trunk switch 73, the unlock switch 72 and the lock switch 71 are decoded in the receiving circuit 24, the ECU 20 releases the failure diagnosing mode in step S78, thus terminating the processes. Conversely, unless the codes corresponding to the trunk switch 73, the unlock switch 72 and the lock switch 71 are decoded, the process proceeds to step S74.

In the absence of the response sound in the loop of steps S34 to S40, the loop of steps S44 to S50, the loop of steps S54 to S60 and the loop of steps S64 to S70 (for example, unless buzzer tone is heard even once), the user can confirm that there is a failure in the mobile unit 60, the receiving antenna 22, the receiving unit 24 or the ECU 20.

Thus, if a failure has occurred in any of a plurality of transmission request means (the first to fourth transmission antennas 11 to 14, the first to fourth transmission portions 15A to 18A, and the oscillators 15B to 18B) or in the mobile unit, the user can easily find out where the failure has occurred. Furthermore, the failure diagnosing mode is introduced and one of the transmission request means is selected so as to transmit a transmission request signal. Thus, by setting the mobile unit at respective locations in the detection zone of the selected transmission request means, the operation of the selected transmission request means can be confirmed. Furthermore, the single transmission request means to be selected among a plurality of transmission request means is sequentially switched from one to another. Thus, the operations of a plurality of transmission request means can be confirmed one by one.

Furthermore, the failure diagnosing mode is triggered when a specific operation of the mobile unit occurs. Therefore, the user can avoid accidentally triggering the failure diagnosing mode when in a normal state of use. Therefore, there is no need to provide a button that is used exclusively for switching modes.

According to the construction of the present invention, if the unlock switch of the mobile unit is pressed during the failure diagnosing mode, the operation is switched in such a manner as to transmit a request signal from another antenna (S40, S50, S60 and S70). However, the switching operation is not limited to this case. That is, the switching operation may cause an antenna desired by the user to transmit a request signal. For example, if a predetermined switch has been pressed once, a first request signal is transmitted from the first transmission antenna 11, whereas if the predetermined switch has been pressed twice, a first request signal is transmitted from the second transmission antenna 12.

In the aforementioned embodiment, the remote control apparatus of the present invention is applied to a motor vehicle. However, the present invention is not limited to the field of motor vehicles, but can also be applied to remote control apparatuses installed in airplanes, ships and the like. The present invention can be applied to any system equipped with a control apparatus that is capable of remotely controlling a plurality of operating machines through communication among a plurality of transmission request devices, a receiver and a mobile unit.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. The remote control method comprising the steps of:
providing a plurality of transmission request devices for transmitting a transmission request signal, a mobile unit for transmitting a response signal in response to the transmission request signal, a receiver for receiving the response signal transmitted in response to the transmission request signal and an operation control device for controlling an operation state of an operating machine depending on whether or not the receiver has received the response signal;

switching the operation control device into a failure diagnosing mode;

selecting one of the transmission request devices in the failure diagnosing mode;

causing the selected transmission request device to transmit a transmission request signal;

receiving the response signal transmitted in response to the transmission request signal;

performing a code verifying operation through communication between the transmission request device and the mobile unit; and diagnosing a failure in the selected transmission request device based on the result of the code verification.

2. A remote control apparatus comprising:
a plurality of transmission request devices for transmitting a transmission request signal;

a mobile unit for transmitting a response signal in response to the transmission request signal;

a receiver for receiving the response signal transmitted in response to the transmission request signal;

an operation control device for controlling an operation state of an operating machine depending on whether or not the receiver has received the response signal; and an ECU configured for diagnosing a failure in each of the transmission request devices.

3. The remote control apparatus according to claim 2, wherein the ECU is further configured for:

switching the operation control device into a failure diagnosing mode; and selecting one of the transmission request devices in the failure diagnosing mode and causing the selected transmission request device to transmit a transmission request signal.

4. The remote control apparatus according to claim 3, wherein when the operation control device is in the failure diagnosing mode, the ECU configured for diagnosing a failure performs a code verifying operation through communication between the transmission request device and the mobile unit and diagnoses a failure in the selected transmission request device based on the result of the code verification.

5. The remote control apparatus according to claim 3, wherein the ECU is further configured for:

switching sequentially between the transmission request devices to be selected by the ECU configured in the selecting one of the transmission request devices in the failure diagnosing mode.

6. The remote control apparatus according to claim 3, wherein the ECU switches the operation control device into the failure diagnosing mode as a result of a specific operation of the mobile unit.

7. The remote control apparatus according to claim 4, further comprising:

a warning device operating when a failure in the transmission request device is determined.

8. The remote control apparatus according to claim 4, wherein the ECU is further configured for:

switching sequentially between the transmission request devices to be selected by the ECU configured in the selecting one of the transmission request devices in the failure diagnosing mode.

9. The remote control apparatus according to claim 4, wherein the ECU switches the operation control device into the failure diagnosing mode as a result of a specific operation of the mobile unit.

* * * * *